United States Patent Office 3,637,903
Patented Jan. 25, 1972

3,637,903
DIIMINE CATALYZED REACTION PRODUCTS HAVING IMPROVED ADHESIVE PROPERTIES
Bernardas Brizgys, Southgate, Mich., assignor to BASF Wyandotte Corporation, Wyandotte, Mich.
No Drawing. Continuation-in-part of application Ser. No. 738,772, June 21, 1968. This application Sept. 15, 1969, Ser. No. 858,122
Int. Cl. C08g 41/04, 45/12
U.S. Cl. 260—830 P
10 Claims

ABSTRACT OF THE DISCLOSURE

Adhesive coating compositions are prepared by mixing and reacting in the presence of certain diimine compounds (1) an organic polyol, (2) an epoxy resin, (3) an organic polyisocyanate, and (4) various fillers and pigments. Such coatings exhibit excellent adhesion to concrete, asphalt and the like.

The present application is a continuation-in-part application of copending application, U.S. Ser. No. 738,772, filed June 21, 1968, and entitled "Diimine Compounds as Catalysts for the Polyurethane Reaction," now U.S. Pat. No. 3,553,118.

The present invention relates to adhesive coating compositions. More particularly, the present invention relates to polyurethane based adhesive coating compositions. Even more particularly, the present invention concerns adhesive coating compositions, useful for coating concrete, asphalt and the like, prepared by mixing and reacting together in the presence of certain diimine compounds (1) an organic polyol, (2) an epoxy resin, (3) an organic polyisocyanate, and (4) various fillers and pigments.

The use of polyurethanes, epoxy resins and the like as adhesive coating compositions for cementitious materials such as concrete, cement and the like has been established in the prior art and has received a good deal of success. However, the heretofore known adhesive coating compositions still suffer a reduction in adhesive properties and tend to break away from the base material when exposed to moisture. Thus, the need for adhesive coating compositions which do not submit to the deleterious effects of moisture is still apparent.

It is therefore an object of the present invention to provide improved adhesive coating compositions. It is another object of the present invention to provide a polyurethane based adhesive coating composition whose adhesive properties remain substantially intact when exposed to moisture. Still another object of the present invention is to provide a process for preparing such a composition. It will become apparent to those skilled in the art that these and other objects are achieved by the present invention from a consideration of the following detailed description thereof.

In accordance with the present invention it has now been found that when certain epoxy resins are incorporated into the polyurethane formulations of my copending application, improved polyurethane-based adhesive coating compositions are thereby provided. As will subsequently be shown, the present adhesive coatings have shown exceptional utility as coatings, either one or two package, for cementitious materials such as concrete, cement and the like. Coatings prepared in accordance with the present invention have been found to be stronger and less flexible than the heretofore known coatings. Most importantly, their adhesive properties are not impaired when exposed to moisture, i.e., the coatings do not break away from the cementitious base upon prolonged exposure to moisture.

The adhesive coatings of the present invention essentially comprise the composition prepared by mixing and reacting in the presence of certain diimine catalyst compounds, (1) an organic polyol, (2) an epoxy resin and (3) an organic polyisocyanate. In addition to these materials, various fillers and pigments are also employed.

The epoxy resin component of the present adhesive coating compositions is selected from the class of resins which generally comprises glycidyl polyethers prepared by reacting an epihalohydrin and a polyhydric phenol, preferably, a bis-hydroxyphenyl alkane. Of this class of resins, it is preferred to employ the liquid resins prepared by the reaction of epichlorohydrin and 2,2-(4,4'-hydroxyphenyl)propane (Bisphenol A). These resins, which are widely known and commercially available, range in molecular weight from about 300 to 1100 depending on the degree of polymerization of the reactants. They are generally prepared by reacting at a temperature ranging from about 75° C. to 125° C. from about one to two moles of the epichlorohydrin per mole of Bisphenol A. The reaction is carried out in the presence of an aqueous alkaline metal hydroxide such as sodium or potassium hydroxide. Generally, a stoichiometric excess of alkali, based on the amount of epichlorohydrin, is employed. The preparation of these resins is more particularly described in U.S. Pat. Nos. 2,500,499 and 2,500,600.

In preparing the present compositions, generally about 2.5 to 10 parts by weight of epoxy resin per 100 parts by weight of polyol are used. Preferably, about 4 to 8 parts by weight of resin per 100 parts of organic polyol are employed.

The diimine compounds contemplated by the present invention, which are more fully described hereinafter, exhibit unexpected utility in that in addition to catalyzing the reaction mixture, they also obviate the need for additional curing agents. In other words, the diimine compounds also function as efficient curing agents for the present coating compounds. Moreover, although not wishing to be bound by any theory, it appears that the diimines influence the properties of the compositions by catalyzing a reaction between the polyisocyanate and the epoxy resin as well as between the polyol and the polyisocyanate. Furthermore, it appears that the diimine compounds are also polymerization catalysts for the epoxy resin.

The diimine compounds which are advantageously employed in the present invention can be represented by the formula:

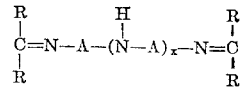

wherein A is alkylene or cycloalkylene having from 2 to 15 carbon atoms, x is an integer from 0 to 2, and R is independently selected from the group consisting of hydrogen and alkyl having from 1 to 6 carbon atoms. These compounds are prepared by the reaction of certain carbonyl compounds with aliphatic polyamines. The reaction is well known in the art as evidenced by Schiff, H., ANN 131, 118 (1864). The reaction is acid catalyzed and is generally carried out by refluxing the carbonyl compound and the amine with an azeotroping agent, if necessary, and separating the water as formed.

Representative carbonyl compounds which may be employed in the preparation of the diimines useful in the present invention include ketones such as acetone, butyl ketone, methyl ethyl ketone, and aldehydes such as acetaldehyde, propionaldehyde and butyraldehyde. Representative aliphatic polyamines which may be employed include diamines such as ethylene diamine, propylene diamine, tetramethylene diamine, and cyclohexylene diamine; triamines such as diethylene triamine, dipropylene triamine, dibutylene triamine, and dicyclohexylene triamine; and tetramines such as triethylene tetramine, tributylene tetramine, tripropylene tetramine, and trihexylene tetramine. The amount of diimine catalyst employed in the present invention may vary considerably, depending upon the reactants. Generally, however, a catalytic amount of diimine compound is employed, e.g. from about 0.6 part to 7 parts by weight of diimine, based on 100 parts by weight of organic polyol.

Illustrative organic polyisocyanates which may be employed in accordance with the present invention include aromatic, aliphatic, and cycloaliphatic polyisocyanates and combinations thereof. Representative of these types are the diisocyanates such as m-phenylene diisocyanate, tolylene-2,4-diisocyanate, tolylene-2,6-diisocyanate, mixtures of 2,4- and 2,6-, hexamethylene-1,6-diisocyanate, tetramethylene-1,4-diisocyanate, cyclohexane-1,4 - diisocyanate, hexahydrotolylene diisocyanate (and isomers), naphthylene-1,5-diisocyanate, 1 - methoxyphenyl-2,4-diisocyanate, 3,3'-dimethoxy-4,4'-biphenyl diisocyanate, 3,3'-dimethyl-4,4'-biphenyl diisocyanate, and 3,3'-dimethyldiphenylmethane-4,4'-diisocyanate; the triisocyanates such as 4,4',4''-triphenylmethane triisocyanate, polymethylene polyphenylisocyanate, and tolylene 2,4,6-triisocyanate; and the tetraisocyanates such as 4,4'-dimethyldiphenylmethane 2,2',5,5'-tetraisocyanate. Especially useful due to their availability and properties are tolylene diisocyanate, diphenylmethane - 4,4'-diisocyanate, and polymethylene polyphenylisocyanate.

Crude polyisocyanate may also be used in the compositions of the present invention, such as crude toluene diisocyanate obtained by the phosgenation of a mixture of toluene diamines or crude diphenylmethane isocyanate obtained by the phosgenation of crude diphenylmethyl diamine. The preferred unreacted or crude isocyanates are disclosed in U.S. Pat. No. 3,215,652. In preparing the present compositions an NCO/OH ratio of about 0.5:1 to 2.0:1 is used and preferably an NCO/OH ratio of 1:1 to 1.5:1 is employed.

As used in the present invention, the term "organic polyisocyanate" also includes isocyanate-terminated polyurethane prepolymers which are prepared by the reaction of an excess amount of any of the above-mentioned organic polyisocyanates with an organic polyol. Any of the organic polyols discussed below may be used.

Representative of the organic polyols which may be employed in accordance with the present invention are those polyols having at least two active hydrogen atoms. The term "active hydrogen atoms" refers to hydrogen atoms which, because of their position in the molecule, display activity according to the Zerewitinoff test as described by Kohler in J. of Am. Chem. Soc., 49, 3181 (1927). Representative organic polyols include polyhydroxyl-containing polyesters, polyalkylene polyether polyols, polyhydroxy-terminated polyurethane polymers, polyhydroxyl-containing phosphorus compounds, aliphatic polyols, and alkylene oxide adducts of polyhydric polythioethers, polyacetals, aliphatic thiols, ammonia, and amines including aromatic, aliphatic, and heterocyclic amines, as well as mixtures thereof. Alkylene oxide adducts of compounds which contain two or more different groups within the above-defined classes may also be used such as amino alcohols which contain an amino group and a hydroxyl group. Also alkylene oxide adducts of compounds which contain one —SH group and one —OH group as well as those which contain an amino group and a —SH group may be used.

Any suitable hydroxyl-containing polyester may be used such as are obtained from polycarboxylic acids and polyhydric alcohols. Examples of polycarboxylic acids that may be used include oxalic acid, malonic acid, succinic acid, glutaric acid, adipic acid, pimelic acid, suberic acid, azelaic acid, sebacic acid, brassylic acid, thapsic acid, maleic acid, fumaric acid, glutaconic acid, α-hydromuconic acid, β-hydromuconic acid, α-butyl-α-glutaric acid, α,β-diethylsuccinic acid, isophthalic acid, terephthalic acid, hemimellitic acid, and 1,4-cyclohexane-dicarboxylic acid. Any suitable polyhydric alcohol including both aliphatic and aromatic may be used such as ethylene glycol, 1,3-propylene glycol, 1,2-propylene glycol, 1,4-butylene glycol, 1,3-butylene glycol, 1,2-butylene glycol, 1,5-pentanediol, 1,4-pentanediol, 1,3-pentanediol, 1,6-hexanediol, 1,7-heptanediol, glycerol, 1,1,1-trimethylolpropane, 1,1,1-trimethylolethane, hexane-1,2,6-triol, α-methyl glucoside, pentaerythritol, and sorbitol. Also included with the term "polyhydric alcohol" are compounds derived from phenol such as 2,2-(4,4'-hydroxyphenyl)propane, commonly known as Bisphenol A.

Any suitable polyalkylene polyether polyol may be used such as the polymerization product of an alkylene oxide or of an alkylene oxide with a polyhydric alcohol. Polyhydric alcohols that may be used include those disclosed above for use in the preparation of the hydroxyl-containing polyesters. Any suitable alkylene oxide may be used such as ethylene oxide, propylene oxide, butylene oxide, amylene oxide, and heteric or block copolymers of these oxides. The polyalkylene polyether polyols may be prepared from other starting materials such as tetrahydrofuran and alkylene oxide-tetrahydrofuran copolymers; epihalohydrins such as epichlorohydrin; as well as aralkylene oxides such as styrene oxide. The polyalkylene polyether polyols may have either primary or secondary hydroxyl groups and, preferably, are polyethers prepared from alkylene oxides having from two to six carbon atoms such as polyethylene ether glycols, polypropylene ether glycols, and polybutylene ether glycols. The polyalkylene polyether polyols may be prepared by any known process such as, for example, the process disclosed by Wurtz in 1859 and Encyclopedia of Chemical Technology, vol. 7, pp. 257–262, published by Interscience Publishers, Inc. (1951) or in U.S. Pat. No. 1,922,459. Polyethers which are preferred include the alkylene oxide addition products of trimethylolpropane, glycerine, pentaerythritol, sucrose, sorbitol, propylene glycol, and 2,2-(4,4'-hydroxyphenyl) propane and blends thereof having equivalent weights of from 250 to 5000.

Suitable polyhydric polythioethers which may be condensed with alkylene oxides include the condensation product of thiodiglycol or the reaction product of a dihydric alcohol such as is disclosed above for the preparation of the hydroxyl-containing polyesters with any other suitable thioether glycol.

The hydroxyl-containing polyester may also be a polyester amide such as is obtained by including some amine or amino alcohol in the reactants for the preparation of the polyesters. Thus, polyester amides may be obtained by condensing an amino alcohol such as ethanolamine with the polycarboxylic acids set forth above or they may be made using the same components that make up the hydroxyl-containing polyester with only a portion of the components being a diamine such as ethylene diamine.

Polyhydroxyl-containing phosphorus compounds which may be used include those compounds disclosed in the copending U.S. patent application of Louis C. Pizzini et al., Ser. No. 728,840, filed May 13, 1968. Preferred polyhydroxyl-containing phosphorus compounds are prepared from alkylene oxides and acids of phosphorus having a $P_2O_5$ equivalency of from about 72% to about 95%.

Suitable polyacetals which may be condensed with alkylene oxides include the reaction product of formaldehyde or other suitable aldehyde with a dihydric alcohol or an alkylene oxide such as those disclosed above.

Suitable aliphatic thiols which may be condensed with alkylene oxides include alkane thiols containing at least two —SH groups such as 1,2-ethane dithiol, 1,2-propane dithiol, 1,3-propane dithiol, and 1,6-hexane dithiol; alkene thiols such as 2-butene-1,4-dithiol; and alkyne thiols such as 3-hexyne-1,6-dithiol.

Suitable amines which may be condensed with alkylene oxides include aromatic amines such as aniline, o-chloroaniline, p-amino aniline, 1,5-diamino naphthalene, and 2,4- diamino toluene; aliphatic amines such as methyl amine, triisopropanol amine, ethylene diamine, 1,3-propylene diamine, 1,4-butylene diamine, and 1,3-butylene diamine.

Other compounds which do not necessarily fit within any of the previously set forth classes of compounds which are quite suitable in the production of isocyanate-terminated prepolymers include the hydroxy-terminated polyurethane prepolymers such as a hydroxy-terminated prepolymer made by reacting an isocyanate with several moles of an alkylene glycol.

The various fillers and pigments employed in the preparation of the present coatings are those which are generally employed in the art. Typical examples of suitable fillers include calcium carbonate, metallic silicates, such as magnesium silicate and aluminum silicate, and the like. Typical pigments are, for example, titanium dioxide, the iron oxides and the like.

Generally about 30 to 70 parts by weight of filler per 100 parts by weight of polyol are employed. The pigment is used in a concentration of from about 20 to 50 parts by weight, based on 100 parts by weight of polyol.

The compositions are prepared by conventional procedures such as by mechanically or manually blending the components together. However, preparation of the coating compositions is facilitated if the epoxy resin and the various fillers and pigments are first dispersed in the polyol. Thereafter, the dispersion is admixed with the isocyanate and then the diimine catalyst is added to the resulting mixture. This procedure is carried out at ambient conditions. After about 5 to 10 minutes of blending the components together, the coating compositions are ready for use.

The coating compositions prepared in accordance herewith are liquids having a 100% solids content, i.e., the present compositions are liquid resins. They can be applied to concrete, asphalt and the like in any conventional manner such as by manual application, spraying and the like. Although the primary value of the compositions is as a coating composition for cementitious materials, they can also be employed with equal efficacy as coatings for wood, glass and the like.

The following examples, which are not to be construed as being unduly limitative of the present invention, set forth specific embodiments thereof. Unless otherwise indicated, all parts are by weight.

EXAMPLE I

A 100% solids, liquid adhesive coating composition was prepared by blending together in an NCO/OH ratio of 1:1 the following ingredients:

| Ingredient: | Parts |
|---|---|
| A 1000 average molecular weight polyol prepared from the reaction of propylene oxide and propylene glycol | 100.0 |
| Castor oil | 20.0 |
| A 1000 average molecular weight epoxy resin prepared from the reaction of epichlorohydrin and Bisphenol A | 10.0 |
| Titanium dioxide | 70.0 |
| Calcium carbonate | 106.0 |
| A diimine catalyst prepared by reacting diethylene triamine/methylisobutylketone | 3.6 |
| Polymethylene polyphenylisocyanate | 46.7 |

The composition was then manually cast onto a glass panel with a 20 mil drawbar to form a film thereon. Thereafter the film was removed and tested for tensile strength, elongation, split tear strength and Shore D hardness, in accordance with the following standard ASTM procedures:

| Split tear strength | ASTM–D1938 |
|---|---|
| Shore "D" hardness | ASTM–2240 |
| Elongation | ASTM–D412 |
| Tensile strength | ASTM–D412 |

The wet and dry adhesion properties of the composition were determined by casting a film of the composition onto two ½" x 1" x 2" cement blocks which were then pressed together and held in that posture for one week and at room temperature. Then, employing standard ASA procedure, ASA Interim Federal Specification for Sealing Compositions, Elastomer Type, Two Component, TT–S–00227D (COM–MBS), Oct. 23, 1968, the dry adhesion strength of the coating composition was determined. This procedure was then repeated, except that the joined blocks were immersed in a water bath maintained at room temperature. After one week of immersion, the blocks were removed from the bath and tested for wet adhesion strength in accordance with the same ASA test referred to above.

The results of the physical properties tests are tabulated below in Table 1.

TABLE 1

| Tesile strength, p.s.i. | 325 |
|---|---|
| Elongation, percent | 122 |
| Split tear, p.s.i. | 13.7 |
| Shore "D" hardness | 20 |
| Wet adhesion, p.s.i. | 58.1 |
| Dry adhesion, p.s.i. | 64 |

A similar composition was then prepared, except that the epoxy resin was eliminated from the formulation. This composition was then tested for physical properties employing the same procedures outlined above. The results are set forth in Table 2.

TABLE 2

| Tensile strength, p.s.i. | 265 |
|---|---|
| Elongation, percent | 105 |
| Split tear, p.s.i. | 11.2 |
| Shore "D" hardness | 15 |
| Dry adhesion, p.s.i. | 68 |
| Wet adhesion, p.s.i. | 44 |

A comparison of the physical properties of the two compositions demonstratively illustrates the improved wet adhesion properties by the addition of the epoxy resin. In addition, except for the dry adhesion strength, all the physical properties of the epoxy resin containing composition were better than the composition without the resin.

EXAMPLE II

A 100% solids, liquid adhesive coating composition was prepared by blending together in an NCO/OH ratio of 1.1:1.0 the following ingredients:

| Ingredient: | Parts |
|---|---|
| A 1500 average molecular weight polyol prepared by reacting propylene oxide and trimethylolpropane | 100 |
| Castor oil | 20 |
| Polymethylene polyphenylisocyanate | 43.7 |
| A diimine catalyst prepared by reacting diethylene triamine and methylisobutylketone | 2 |
| A 1000 average molecular weight epoxy resin prepared by reacting epichlorohydrin and Bisphenol A | 5 |
| Calcium carbonate | 146 |
| Titanium dioxide | 20 |

A similar composition was thereafter prepared except that the epoxy resin was eliminated as an ingredient. A comparison of the physical properties of the two compositions is set forth below in Table 3. In the table, composition 1 is the composition with the epoxy resin, composition 2 is the one without. The properties of the compositions were determined in accordance with the ASTM procedures enumerated in Example I.

TABLE 3

| Properties | Composition 1 | Composition 2 |
|---|---|---|
| Tensile strength, p.s.i. | 325 | 327 |
| Elongation, percent | 91 | 104 |
| Split tear, p.s.i. | 9.7 | 9.3 |
| Shore "D" hardness | 21 | 16 |
| Dry adhesion, p.s.i. | 82 | 52 |
| Wet adhesion, p.s.i. | 75 | 47 |

The data again demonstrates the improved wet adhesion properties of urethane coating compositions by the addition thereto of the epoxy resins as well as the other improved physical properties thereof.

What is claimed is:

1. A polyurethane-based adhesive coating composition prepared by mixing and reacting an organic polyol, an organic polyisocyanate, from about 2.5 to 10 parts by weight per 100 parts by weight of said polyol of an epoxy resin prepared by the reaction of an epihalohydrin and a bis-hydroxyphenyl alkane, and from about 0.6 to 7.0 parts by weight per 100 parts by weight of said polyol of a diimine compound

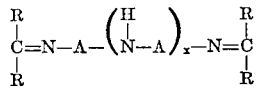

wherein A is alkylene or cycloalkylene having from 2 to 15 carbon atoms, $x$ is an integer from 0 to 2, and R is selected from the group consisting of hydrogen and alkyl having from 1 to 6 carbon atoms.

2. The composition of claim 1 wherein said diimine compound is prepared from the reaction of diethylenetriamine and methylisobutylketone.

3. The composition of claim 1 wherein said epoxy resin comprises the reaction product of epichlorohydrin and 2,2-(4,4'-bis-hydroxyphenyl)propane.

4. The composition of claim 1 wherein said organic polyisocyanate is polymethylene polyphenylisocyanate.

5. The composition of claim 1 wherein said organic polyol is a polyether polyol prepared by reacting propylene oxide with a polyhydric alcohol selected from the group of trimethylolpropane and propylene glycol.

6. An improved process for the manufacture of a polyurethane-based adhesive coating composition of the type which comprises catalytically reacting an organic polyol with an organic polyisocyanate, wherein the improvement comprises:

(a) dispersing in said polyol prior to reaction with said polyisocyanate, from about 2.5 to 10 parts by weight, based on 100 parts by weight of said polyol, of an epoxy resin comprising the reaction product of an epihalohydrin and a bis-hydroxyphenyl alkane, and (b) catalyzing said reaction with a diimine compound

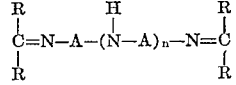

wherein A is alkylene or cycloalkylene having from 2 to 15 carbon atoms, $x$ is an integer from 0 to 2, and R is independently selected from the group consisting of hydrogen and alkyl having from 1 to 6 carbon atoms.

7. The process of claim 6 wherein said diimine compound is prepared from the reaction of diethylenetriamine and methylisobutylketone.

8. The process of claim 6 wherein said epoxy resin comprises the reaction product of epichlorohydrin and 2,2-(4,4'-bis-hydroxyphenyl)propane.

9. The process of claim 6 wherein said organic polyisocyanate is polymethylene polyphenylisocyanate.

10. The process of claim 6 wherein said organic polyol is a polyether polyol prepared by reacting propylene oxide with a polyhydric alcohol selected from the group of trimethylolpropane and propylene glycol.

References Cited

UNITED STATES PATENTS

| | | | |
|---|---|---|---|
| 3,148,167 | 9/1964 | Keplinger | 260—830 P |
| 3,158,586 | 11/1964 | Krause | 260—830 P |
| 3,242,108 | 3/1966 | McGary et al. | 260—830 P |
| 3,426,097 | 2/1969 | Ilkka et al. | 260—830 P |
| 3,525,779 | 8/1970 | Hawkins | 260—830 P |

JOHN C. BLEUTGE, Primary Examiner

U.S. Cl. X.R.

117—123 D, 124 E, 148, 161 KP, 161 ZB; 260—37 EP, 37 N, 40 T N, 835